Patented May 3, 1927.

1,626,857

UNITED STATES PATENT OFFICE.

SHERMAN C. MEREDITH, OF BURLINGAME, AND NIELS N. T. NYBORG, OF MODESTO, CALIFORNIA.

PROCESS OF MANUFACTURING LACTOSE.

No Drawing.   Application filed December 12, 1922. Serial No. 606,532.

This invention relates to a process of manufacturing lactose and especially to that step or series of steps by which the fat and albumen are precipitated and removed.

A common and frequently practiced method of extracting milk sugar or lactose from whey, briefly stated, consists in—(1) Precipitating the casein by heating the milk from 90 to 96° Fahrenheit, and then adding a sufficiently large quantity of diluted hydrochloric acid to bring about a clear separation of the casein from the whey; (2) removing the casein by filtration or otherwise; (3) treating the whey with an alkali, usually in the form of milk of lime, to neutralize the excess acid in the whey; (4) heating the whey usually to the boiling point to coagulate and precipitate the albumen and fat contents; (5) removing the coagulum by filtration or otherwise; (6) concentrating the clarified whey by evaporating in a vacuum pan until it becomes syrup like in consistency; (7) transferring the whey to a crystallizing vat, where it is allowed to remain undisturbed until it has cooled and crystallization has taken place; (8) separating the mother liquor and the crystals, and (9) washing the crystals to remove adhering impurities.

The above described steps only produce a product known as crude sugar, and as this product is not marketable, the following refining steps will also have to be considered but it should be understood that these steps do not form any part of the present application.

(10) The washed sugar is transferred to a vat where it is re-dissolved in water; (11) treated with a mixture of bone black and sulphurous acid and re-heated to the boiling point; (12) when this operation is completed, the syrup is pumped under pressure through a filter and collected in a receiving vat; (13) it is again pumped througn a charcoal filter to insure clarification; (14) and is then delivered to a vacuum pan for re-concentration; (15) when the desired consistency is obtained, it is transferred to the crystallizing vat; (16) After crystallization, the crystals and the mother liquor are again separated; (17) and the crystals are again subjected to a thorough washing, which results in the final product which is pure white sugar.

The above described process is wasteful and objectionable from a number of points of view, that is the thermal-efficiency of the process is very low and the extraction and recovery of the sugar from the whey seldom exceeds 50% of the total content. The main objections may be enumerated as follows:

First, the whey is received containing an unknown quantity of acid; second, a method of determining the exact amount of acid present before and after neutralization is not employed; third, in order to effect a complete precipitation of the albumen, it is generally considered necessary that the whey should at all times show an acid reaction; fourth, acid in the presence of heat has a tendency to invert some of the sugar present in the whey. Taking this fact into consideration it will be readily seen that the practice of retaining any acid whatever in the whey is objectionable. Also this inversion increases in direct proportion to the temperature employed, and the amount of acid present. Therefore conditions are very favorable for inversion and inversely favorable to maximum recovery of the sugar present in the whey. Fifth, the sugar in the whey is sensitive to heat and when boiling temperatures are employed, the sugar has a tendency to caramelize. That this caramelization does take place to a very marked degree is evidenced by the color of the crude sugar recovered from the whey, which has been subjected to such high temperatures. Caramelization of sugar solutions takes place in direct proportion to the temperature to which it is subjected. The practice of employing such temperatures must, therefore, necessarily be considered a very serious objection. Sixth, live steam is introduced into the whey for the purpose of heating the whey. This is also objectionable as the condensation of the steam tends to greatly increase the bulk of the whey or liquid to be evaporated. Seventh, it has already been stated that the whey is subjected to heat for the purpose of obtaining a separation of the albumen from the whey. It is desirable to produce the whey absolutely free from albumen. However, the above described process of coagulating the albumen cannot be considered an ideal method. It is admitted that coagulation of all of the albumen does undoubtedly take place, yet the coagulum or precipitate is present in such a finely divided state that some of these finely divided particles of precipitate are held in suspension in the whey and fail to separate out. It will be found that upon subsequent filtration that even the filter process fails to find all of these fine particles of precipitate and that they are, therefore, carried with the whey into the vacuum pan and subjected to the same conditions as the whey during the evaporating process. When the whey has reached the desired syrup consistency, it is discharged into the crystallization vat to cool and crystallize. The precipitate is naturally also carried with the syrup into the crystallizing vat, where the fine particles of precipitate lend themselves as nuclei for the sugar crystals to form upon and around, and when the crystallization has been completed, these fine particles of precipitate are firmly enclosed in the hard sugar crystals. Eighth, the crude sugar crystals formed are separated from the mother liquor and are then subjected to a washing action. Such washing is extravagant in that the losses of sugar in the water are comparatively great and the sugar thus lost is not recoverable. Ninth, the sugar crystals thus formed and washed must necessarily be subjected to a purifying action to remove the enclosed precipitate, and also to remove color produced by caramelization. It therefore necessary, in order to free the crystals of these impurities, to re-melt the crystals. To accomplish this the sugar crystals are re-dissolved in four to five times their weight of water. After the sugar has been re-dissolved, a mixture of sulphurous acid and bone-black is added; these ingredients being added merely for the purpose of decolorization of the syrup. The mixture is then heated and pumped through the filter press to remove the precipitate or solids and is again delivered to the vacuum pan to be re-evaporated. Tenth, after re-evaporation and crystallization, separation of the crystals and mother liquor must again be resorted to and the crystals are then subjected to a final and thorough washing action before a refined product is obtained, thus causing another loss in sugar which reduces the final recovery to approximately 50%.

The process or method forming the subject matter of the present application eliminates all of the objections above specified. It increases the total recovery of sugar to approximately 85% and materially decreases the cost of manufacture, due to the greater thermal-efficiency obtained, and lessening of the time and steps employed. This is accomplished, first, by determining the acid present in the whey before neutralization; secondly, neutralizing all of the acid present in the whey by the addition of an alkali, and by adding an excess thereof; third, employing a lower temperature during the coagulating process; fourth, employing a method of coagulating the albumen that will effect an absolute separation and, at the same time, form a precipitate that may be readily collected and retained in the filter process; fifth, heating the whey during the coagulating step without introducing the steam directly into the whey, thereby eliminating an increase in volume of the whey or liquid to be evaporated; and, sixth, producing a milk sugar equal in quality to the material hereinbefore described as refined by means of a single crystallization, thereby eliminating two or more washings of the sugar crystals and re-melting and re-evaporation thereof.

The casein making or precipitating step used in conjunction with this process of whey purification is described in a publication known as, "The Journal of Industrial and Engineering Chemistry," vol. #12, No. 12, December 6, 1920, under the title "Studies on technical casein," grain curd casein, by W. Mansfield Clark, H. F. Zollen, A. O. Dohlberg and A. C. Weinman, Research Division Bureau of Animal Industry, U. S. Department of Agriculture. The process there described is the one which we preferably employ, but any standard process may be employed.

The whey from which the casein has been separated is received in the sugar factory at a temperature of about 34° centigrade and is immediately treated with a sufficient amount of milk of lime prepared by slaking calcium oxide with water to a mixture of 20° Brix, to neutralize the free acids present and provide an excess of about 1% of calcium oxide which combines with the solids present in the whey, to-wit, albumen and fats. For 1000 kilogrammes whey this would require an amount of milk of lime equivalent to from 20 to 30 kilogrammes of calcium oxide. The mixture of whey and milk of lime is placed in a tank provided with heating coils and a perforated coil in the bottom for the addition of carbon dioxide. Steam is admitted into the heating coils at a pressure of not to exceed 5 lbs., gauge pressure, and carbon dioxide is injected through the perforated pipe. The carbon dioxide is admitted until the clear liquid separated from the precipitate has a $pH$ value of 8.4 or is neutral to phenolphthalein indicator. The delivery of steam to the coils and carbon dioxide to the liquid should be so coordinated that the whey gradually increases in temperature to coagulate and precipitate the albumen content and the supply of carbon dioxide is gradually decreased, as the temperature of the whey increases. The final temperature of the liquid should not exceed 80° centigrade. From the carbonating tank the material is pumped to a filter press where a clear substantially albumen free liquid is separated from the material precipitated by the carbon dioxide and heat. To the clear liquid obtained from the filter press there is added a sufficient amount of a decolorizing carbon, such as "Norit" or "Darco," to produce complete declorization. In practice 1% "Norit" on the weight of clarified whey has proved sufficient to produce the desired decolorization effect. This, however, is dependent on the amount of color originally present in the whey and on its preliminary treatment. The carbon is removed from the whey by pressing the mixture through a filter press and the clear, colorless, liquid is concentrated by evaporation at as low a temperature as possible to a syrup containing about 40% lactose. This syrup is drawn into a vacuum pan where the concentration is carried out to a point where crystals of substantially pure lactose separate. The magma of lactose crystals and mother liquor are discharged into receiving tanks, whence they are drawn into centrifugals where the mother liquor is spun off and the last traces removed by washing with cold water. The crystals are removed from the centrifugals and dried either in trays or in any other convenient manner and ground, bolted and packed for the market. The mother liquor obtained is treated as the originally concentrated whey. By this means a second crop of lactose crystals is obtained. The second crop of crystals is dissolved in water and introduced into the vacuum pan with the evaporated clarified whey.

It has been found by experiment that lactose is relatively insensitive to heat when in slightly alkaline or neutral solution. This process is so designed as to avoid all heating while the lactose containing material is acid in reaction.

When lime in excess of that necessary to neutralize the free acids is added to whey and the lime precipitated with $CO_2$ at elevated temperatures, $CaCO_3$ is precipitated in granular form containing either as chemical combination or as a mechanical admixture all albumen and fat originally present in the whey. When whey is treated as described herein, the product is a clear, slightly colored, liquid free from all but traces of albumen. The treatment with the decolorizing carbon, such as "Norit," removes the last traces of albumen and all the coloring matter present. A substantial elimination of inorganic material is also effected by the treatment with lime. The precipitation of the lime may be completed in one step by carbonating until the material has a $pH$ value of 8.4 or is neutral to phenolphthalein, or there may be an intermediate separation of the $CaCO_3$; that is to say, the carbonation may be carried to a point short of neutrality, the precipitate filtered off, and the resultant liquid carbonated to the proper reaction. Since the $CaCO_3$ is precipitated in granular form, it forms an efficient filtering medium for the whey, thus avoiding the necessity for a preliminary settling of the material or for the addition of any further filter aid such as kieselguhr. This filter medium effectively retains finely divided impurities which, without it, would tend to pass through the filter cloth.

*Temperatures.*

1. Carbonation between 55° C. and 95° C.
2. Evaporation not higher than 90° C.
3. Crystallization not higher than 80° C.

*Alkalinity.*

Reduced by carbonation to $pH$ 8.4.
Maintain as nearly as possible through entire process.

*Limits of acidities.*

Limits within which carbonation can be carried out as expressed in $pH$ values, from 8. to 9.2.

*Limit of temperatures.*

The range of temperatures within which a coagulation of the albumen of the whey may be effected, when employed in conjunction with $CO_2$ is from 50° C. to 95° C., although the best and most complete coagulation takes place at a temperature of 80° C.

Having thus described our invention, what we claim and desire to secure by Letters Patent is—

1. In the process of extracting lactose from whey the steps which consist in adding an alkali in excess of that required to neutralize the acid content of the whey and heating the whey to coagulate the albumen content.

2. In the process of extracting lactose from whey, the steps which consist in adding a sufficient quantity of milk of lime to completely neutralize the acid content and to provide an excess of lime, heating the whey to an approximate temperature of 80° C., and maintaining it at this temperature until the albumen contained is coagulated, and then passing carbon dioxide gas through the whey until the whey has a $pH$ value of 8.4 or is neutral to a phenolphthalein indicator.

3. In the process of extracting lactose from whey the steps which consist in adding an alkali in excess of that required to neutralize the acid content of the whey, heating the whey and gradually increasing the temperature to coagulate and precipitate the albumen content, and gradually decreasing the alkali content as the temperature increases.

4. In the process of extracting lactose from whey, the steps which consist in adding a sufficient quantity of milk of lime to completely neutralize the acid content and to provide an excess of lime, heating the whey to an approximate temperature of 80° C., and maintaining the whey at this temperature until the albumen contained is coagulated, then passing carbon dioxide acid gas through the whey until the whey has a $p$H value of 8.4 or is neutral to a phenolphthalein indicator, clarifying the whey to remove the precipitated lime and albumen, concentrating the clarified whey until crystals of lactose are formed, removing the crystals and maintaining the whey at a $p$H value of 8.4 during the clarifying step and the crystallizing step so that crystals having a slightly alkaline content will be obtained.

SHERMAN C. MEREDITH.
NIELS N. T. NYBORG.